United States Patent Office 3,089,758
Patented May 14, 1963

3,089,758
CONCENTRATION OF RARE EARTHS
Paul R. Kruesi, Signal Mountain, Tenn., assignor, by mesne assignments, to Vitro Corporation of America, New York, N.Y., a corporation of Delaware
No Drawing. Filed Apr. 18, 1960, Ser. No. 22,660
6 Claims. (Cl. 23—296)

The present invention relates to the concentration of rare earth elements. More particularly, it relates to the concentration of europium.

The unique nuclear properties of europium have promoted the development of a number of uses for this element in the field of atomic energy. Europium has an absorption cross-section for thermal neutrons of about 4,600 barns and thus is useful as a control rod material in nuclear reactors.

The classical methods previously used to concentrate europium to a value which would make recovery feasible require considerable handling and numerous chemical operations. The present crystallization method offers the advantage of a physical beneficiation together with semi-continuous procedures.

The europium content of rare earth ores, specifically monazite, is quite low, averaging from 0.05% for Brazilian and Indian monazite to about 0.1% for American monazite. The recovery of europium from liquors containing such low concentrations results in very poor yields and further present problems in materials handling.

It is thus an object of the present invention to provide an effective and useful method for the concentration of rare earth elements, and, particularly to europium, by the crystallization of rare earth chloride solutions.

This and other objects of the present invention will become apparent as the description proceeds.

In general the method of the present invention relates to the crystallization of rare earth chloride solutions which may be obtained from the cracking of monazite. Monazite consist predominantly of rare earth phosphates. Treatment with sodium hydroxide converts said phosphates to their corresponding hydroxides which then form the chloride salts when they are dissolved in hydrochloric acid.

The solution of mixed rare earth chlorides is concentrated by heating to a temperature of from about 157° F. to about 162° F. until the specific gravity is from about 1.83 to about 1.87. The solution is then cooled slowly to a temperature of from about 122° F. to about 125° F. over a period of from about 10 to about 13 hours. A crop of crystals (hereafter referred to as "cold crystals") separates from the solution and is separated. These "cold crystals" are enriched in the light rare earths, specifically, cerium, lanthanum, while the mother liquor is enriched in those rare earths with atomic numbers greater than 59 but including yttrium. The mother liquor is again concentrated by heating until the specific gravity is from about 1.85 to about 1.92. The temperature is then allowed to drop no more than about 3° F. over a period of about 3 to about 5 hours. The pressure may be adjusted as desired to aid in maintaining the temperature fairly constant. A second crop of crystals is thus obtained and is also separated. This second crop of crystals (hereafter referred to as "hot crystals") is enriched in the heavier rare earth elements. The mother liquor which is enriched in the lighter rare earth elements is then recycled to the head of the process. The europium concentration in the "hot crystals" is better than twice the initial europium value of the feed liquor.

The "hot crystals" may, in addition, be treated according to the process described in copending patent application, Serial No. 22,661, filed on even date herewith, by Hugh J. Bronaugh and Paul R. Kruesi, now United States Patent Number 3,089,759, and entitled "Concentration of Rare Earths," in order to obtain crystals further enriched in europium. The latter crystals may in turn be dissolved in water and circulated through a bed of metallic zinc to reduce the europic ion to the europous ion. The addition of ammonium sulfate and barium ion to the solution containing the europous ions precipitates europous sulfate in a matrix of barium sulfate. The latter material may then be processed according to the method discussed in copending patent application Serial No. 22,834, filed on even date herewith by Hugh J. Bronaugh, and entitled "Purification of Europium," to yield europium oxide having a purity of about 99.8% to 99.9%.

The effectiveness of the present process is believed to depend on the formation of an unstable crystalline hydrate. On slow cooling, the solution of mixed rare earth chlorides produces a crop of crystals enriched in lighter rare earth metals. Reheating and maintaining the temperature practically constant for a period of several hours produces crystals enriched in heavier rare earth metals.

The following examples illustrate the present invention without, however, limiting the same thereto. Cerium may be considered as representative of the group of light rare earth elements, whereas europium may be classed as a typical heavier rare earth element.

EXAMPLE I

The crystallizer was charged with 1,500 gallons of a solution of rare earth chlorides having the following analysis: Total oxide=348 grams/liter; specific gravity=1.44; cerium oxide ($CeO_2$) to total oxide (T.O.) ratio=45.25% and the europium oxide ($Eu_2O_3$) to total oxide ratio= 0.10%. The solution was concentrated by vacuum distillation under 24″ of mercury until the specific gravity reached a value of 1.85. At this point the temperature was 160° F. The solution was then cooled at a constant rate over a period of twelve (12) hours to a temperature of 122° F. at which time the crystals thus produced were separated from the mother liquor by centrifuging. The mother liquor was recycled to the crystallizer as feed for the second stage of the process. The total weight of crystals (cold crystals) obtained was 6,790 pounds, having the following analysis: Total oxide=45.21%; $CeO_2$/T.O.=49.09%; $Eu_2O_3$/T.O.=0.02%. The second stage of the process was completed by concentrating the mother liquor from the first crystallization under 24″ of mercury to 160° F. at which point rapid crystallization took place. The crystals (hot crystals) were separated from the mother liquor within three (3) hours after crystallization took place. The mother liquor from the second stage was recycled as feed to the first operation. The total weight of hot crystals obtained was 3,060 pounds having the following analysis: Total oxide (T.O.)=45.67%; $CeO_2$/T.O.=35.56%; $Eu_2O_3$/T.O.= 0.24%.

Table I summarizes the data obtained from the above experiment.

*Table I*

MATERIAL BALANCE DATA (EXAMPLE I)

|  | Lbs. $R_2O_3$ | Lbs. $CeO_2$ | Lbs. $Eu_2O_3$ |
|---|---|---|---|
| Feed | 4,380 | 1,990 | 4.38 |
| Cold Crystals | 3,060 | 1,500 | 0.63 |
| Hot Crystals | 1,400 | 497 | 3.36 |
| Percent Recovery | 102 | 100 | 90.6 |
| Yield, percent |  |  | 76.6 |

These data have been tabulated on the assumption that the volume and analysis of the mother liquor returned to the crystallizer at the completion of the experimental run is comparable to the heel retained in the crystallizer at the beginning of said experiment.

EXAMPLE II

This illustration of the process is derived from the data obtained over a period of ten (10) days, [twenty-four (24 hours/day)] of operation. The procedure was identical with that previously cited in Example I. Table II summarizes the results obtained from this extended experiment.

*Table II*

CRYSTALLIZATION DATA FOR LOTS 218 THROUGH 227

|  | Feed | Cold Crystals | Hot Crystals |
|---|---|---|---|
| Wt. of Chloride Crystals, lbs | | 71,523 | 26,627 |
| Wt. of Total Oxide (T.O.=$R_2O_3$), lbs | 39,915 | 32,353 | 12,238 |
| Average T.O., percent | | 45.20 | 45.95 |
| Average $CeO_2$/T.O., percent | 44.88 | 48.87 | 35.39 |
| Average $Eu_2O_3$/T.O., percent | 0.089 | 0.044 | 0.22 |

The data in the above table shows that cerium is concentrated in the "cold crystals" while europium is concentrated in the "hot crystals."

As many and varied modifications of the subject matter of this invention will become apparent to those skilled in the art from the detailed description given herein, it should be understood that this invention is to be limited only in accordance with the appended claims.

What is claimed is:

1. A process for the concentration of rare earth elements comprising heating an aqueous solution of the chlorides of said elements at a temperature of from about 157° F. to about 162° F. until the specific gravity is from about 1.83 to about 1.87, cooling said solution to from about 122° F. to about 125° F. over a period of about 10 to about 13 hours, separating the resulting crystals enriched in light rare earths, heating the mother liquor until the specific gravity is from about 1.85 to about 1.92, allowing the mother liquor to cool no more than about 3° F. over a period of about 3 to about 5 hours and separating the resulting crystals enriched in heavier rare earths and yttrium.

2. A process for concentrating europium comprising heating a chloride solution of rare earth elements at a temperature of from about 157° F. to about 162° F. until the specific gravity is from about 1.83 to about 1.87, cooling said solution to from about 122° F. to about 125° F. over a period of about 10 to about 13 hours, separating the resulting crystals, heating the mother liquor until the specific gravity is from about 1.85 to about 1.92, allowing the mother liquor to cool no more than about 3° F. over a period of about 3 to about 5 hours and separating the resulting crystals enriched in europium.

3. A process according to claim 1 wherein the mother liquor from the first crystallization is concentrated by heating at a temperature of about 160° F. under a vacuum of about 24" of mercury.

4. A process according to claim 2 wherein the mother liquor from the first crystallization is concentrated by heating at a temperature of about 160° F. under a vacuum of about 24" of mercury.

5. A process according to claim 1 wherein the ratio of europium to total rare earths expressed as the oxides is at least about 0.08% in the starting material and at least about 0.2% in the final crystals.

6. A process according to claim 2 wherein the ratio of europium to total rare earths expressed as the oxides is at least about 0.08% in the starting material and at least about 0.2% in the final crystals.

References Cited in the file of this patent

UNITED STATES PATENTS

| 2,013,767 | Schulze | Sept. 10, 1935 |
| 2,199,697 | Fleck | May 7, 1940 |

OTHER REFERENCES

Vickery: Chem. of the Lanthanums (1953), pages 110 to 123.

UNITED STATES PATENT OFFICE
CERTIFICATE OF CORRECTION

Patent No. 3,089,758                                      May 14, 1963

Paul R. Kruesi

It is hereby certified that error appears in the above numbered patent requiring correction and that the said Letters Patent should read as corrected below.

Column 1, line 32, for "to" read -- of --; column 2, Table I, last column, second item, for "0.63" read -- 0.61 --; column 4, line 39, for "Lanthanums" read -- Lanthanons --.

Signed and sealed this 3rd day of December 1963.

(SEAL)
Attest:

ERNEST W. SWIDER

Attesting Officer

EDWIN L. REYNOLDS

Acting Commissioner of Patents